United States Patent [19]
Hishida

[11] 3,990,136
[45] Nov. 9, 1976

[54] METHOD FOR PRODUCING REVOLVING PARTS

[75] Inventor: Tadashi Hishida, Sakai, Japan

[73] Assignee: Wada Seiko Kabushiki Kaisha (Wada Seiko Co., Ltd.), Osaka, Japan

[22] Filed: Oct. 6, 1975

[21] Appl. No.: 619,679

[30] Foreign Application Priority Data
Jan. 17, 1975  Japan.................................. 50-8253

[52] U.S. Cl. ........................... 29/159.2; 29/148.4 R; 29/159 R; 74/230.3; 74/230.4; 74/439; 264/263; 264/273; 264/274

[51] Int. Cl.² ..................... B21D 53/28; B21H 5/02; B21K 1/30; B29D 15/00

[58] Field of Search ........ 29/159.2, 159 R, 148.4 R, 29/148.4 A; 264/328, 263, 274, 261, 273, 241, 249; 74/434, 439, 230.3, 230.4

[56] References Cited
UNITED STATES PATENTS

| | | |
|---|---|---|
| 2,624,104 | 1/1953 | Finstead....................... 29/159 R X |
| 2,845,696 | 8/1958 | Bourgues ......................... 264/263 X |
| 3,076,352 | 2/1963 | Larsh............................ 29/159.2 X |
| 3,367,199 | 2/1968 | Dankowski ...................... 74/230.3 |
| 3,815,201 | 6/1974 | Conrad ............................ 29/159.2 |

FOREIGN PATENTS OR APPLICATIONS 821,536  10/1959  United Kingdom................ 29/159.2

Primary Examiner—Victor A. DiPalma
Attorney, Agent, or Firm—George B. Oujevolk

[57] ABSTRACT

There is provided a method for producing revolving parts, such as sprockets, gears and pulleys, for light loads. A metallic annular member formed with notches in its inner periphery is mounted on a bearing. A boss is molded on each side of the annular member by use of a mold to secure the annular member to the outer race of the bearing. Engaging means formed in the outer periphery of the outer race of the bearing serve to make the annular member integral with the outer race.

1 Claim, 3 Drawing Figures

METHOD FOR PRODUCING REVOLVING PARTS

The present invention relates to a method for producing revolving parts, such as gears, pulleys and sprockets, for relatively light loads.

For revolving parts of this kind, ones made of synthetic resin material are in practical use. Conventionally, such revolving parts have been manufactured by molding their annular main body of synthetic resin and mounting and antifriction bearing, such as a ball bearing or a roller bearing, in its center opening.

By such a conventional method, close-tolerance revolving parts could not be produced since a synthetic resin member is combined with a bearing that is metal. Furthermore, such revolving parts had a limited strength and thus a short working life because they carry a load directly on the synthetic resin member, even if they are intended for light load applications.

An object of the present invention is to provide a method for producing revolving parts which has their main body made of metal for longer working life.

Another object of the present invention is to provide a method for producing revolving parts in which the metallic main body is secured to the bearing by molding a synthetic resin boss member by use of a mold simple in construction.

According to the pesent invention, there is provided a method for producing close-tolerance, highly durable revolving parts which comprise an antifriction bearing, an annular member mounted on the outer race of the bearing, and a synthetic resin member for securing the annular member to the outer race to prevent rotation of the former relative to the latter.

Other objects of the present invention will become apparent from the following description with reference to the accompanying drawings, in which.

Figure 1:
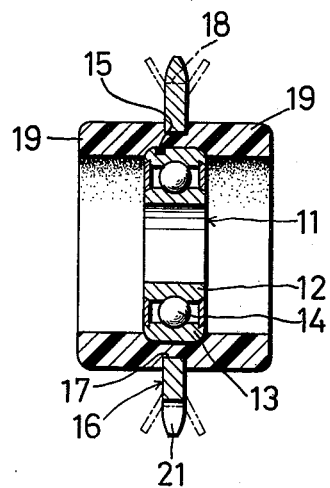
FIG. 1 is a sectional side view of a revolving part produced by the method according to the present invention, the revolving part being a sprocket by way of example.
Figure 2:
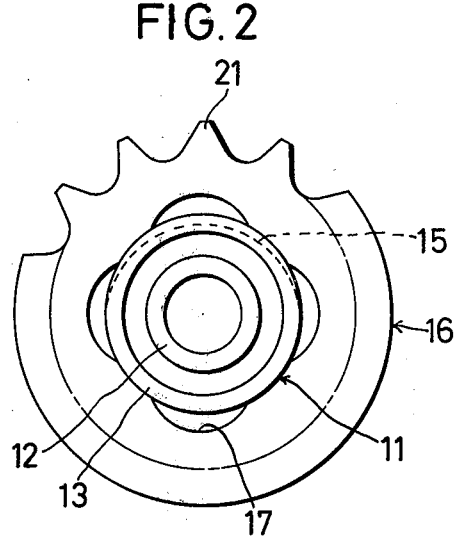
FIG. 2 is a front view thereof, showing the same prior to the molding of a synthetic resin member.

Referring to FIGS. 1 and 2, a ball bearing 11 has an inner race 12, an outer race 13 and a plurality of balls 14 held therebetween. The bearing may be a roller bearing.

The outer race 13 has an eccentric groove 15 formed circumferentially in its outer peripheral surface. The eccentric groove 15 can be easily cut by pressing a cutting tool against the outer periphery while rotating the outer race 13 eccentrically. The outer race 13 may be formed with recesses, projections or any other suitable engaging means, instead of an eccentric groove.

Figure 3:
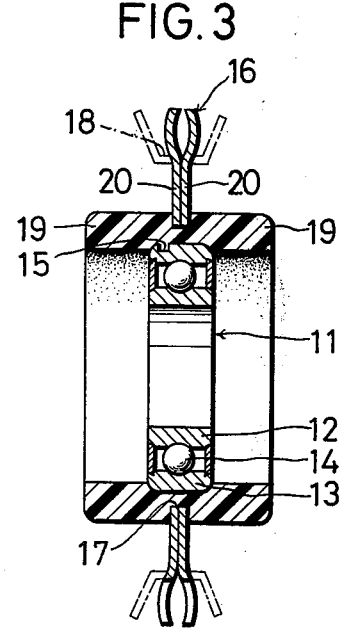
FIG. 3 is a sectional side view of another revolving part produced by the method according to the present invention, the revolving part being a sprocket in this case, too.

An annular member, or main body, 16 is mounted on the ball bearing 11. In this embodiment, the annular member 16 is a sprocket having teeth 21 on its outer periphery. The annular member 16 is machined to have such an inner diameter as to closely fit on the outer race 13. Thus, it is coxially mounted on the bearing 11. The annular member 16 may be a gear having teeth of different shape or a pulley having a peripheral groove 18 formed therein as shown in FIGS. 1 and 3 by a long and short dash line.

The annular member 16 is formed in its inner periphery with a plurality of arcuate notches 17 arranged at a regular distance. It may also be formed with through holes instead.

The annular member 16 with the bearing 11 mounted therein is set in a mold and thermoplastic synthetic resin is injected thereinto to secure the annular member 16 to the outer race 13. The synthetic resin forms an annular boss 19 at each side of the annular member 16 and on the outer periphery of the outer race 13. Synthetic resin fills the eccentric groove 15 in the outer race 13, so that once it cures, the bosses 19 never rotate relative to the outer race 13.

The bosses 19 on both sides of the annular member 16 constitute an integral portion through the notches 17. The annular member 16 also becomes integral with the boss 19.

The annular member 16 is now integral with the outer race 13 with the interposition of the boss 19. Such revolving parts are easy to manufacture and are therefore suitable for mass production because the annular member 16 can be fixed on the outer race 13 simply by molding a one-piece boss of synthetic resin by use of a mold. Since synthetic resin flows through the notches 17 in the annular member 16 from one side to the other, a mold will suffice which is simple in construction with a single injection port.

After resin in the mold has cured, the revolving part is removed from the mold. It will have such a cross section as shown in FIG. 1.

The embodiment of FIG. 3 has an annular member 16 constituted by two steel sheets 20 rivetted, welded or secured to each other by other suitable means. Even considerably large evolving parts can be easily mass produced by cutting out sheet steel into required shape with a press and securing together two or more of such sheets one upon another to form the annular member.

From the foregoing description, it will be understood that the present invention provides an efficient method for producing revolving parts which have a longer service life because of a metallic main body and yet are relatively light in weight because of a synthetic resin boss.

Since a metallic annular member is closely mounted on the outer race of a bearing, revolving parts with high roundness can be manufactured.

While the invention has been shown with reference to preferred embodiments, it will be understood by those skilled in the art that other changes can be made without departing from the spirit and scope of the invention.

What is claimd is:

1. A method for producing revolving parts, such as, sprockets, gears and pulleys, including a metallic annular member (16) mounted on an antifriction bearing of a desired thickness, comprising the steps of:
    a. forming said metallic annular member with a plurality of notches (17) or through holes in the inner periphery thereof and with such an inner diameter as to be closely fitted on the outer race (13);
    b. forming the outer race (13) of said bearing with engaging means in the outer periphery thereof;
    c. mounting said metallic annular member (16) on the outer race (13) of said bearing;
    d. setting said annular member (16) with a bearing (11) therein in a mold and injecting a thermo plastic resin thereinto to secure said annular member

(16) to the outer race (13) by filling the engaging means (15); and, e. forming an annular boss (19) of synthetic resin material at each side of said annular member on the outer periphery of the outer race (13) to secure said annular member to the outer race, whereby said bosses (19) are formed integral with each other through said notches (17) or through holes and said engaging means (15) serving to make said annular member integral with the outer race.

* * * * *